United States Patent
Ehrlich et al.

(10) Patent No.: US 8,414,001 B2
(45) Date of Patent: Apr. 9, 2013

(54) SUSPENSION OF A VEHICLE AXLE AND VEHICLE

(75) Inventors: Dirk Ehrlich, Bodenheim (DE); Werner Brinker, Darmstadt (DE)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 13/396,709

(22) Filed: Feb. 15, 2012

(65) Prior Publication Data

US 2012/0217716 A1    Aug. 30, 2012

(30) Foreign Application Priority Data

Feb. 24, 2011    (DE) .................... 10 2011 012 373

(51) Int. Cl.
*B60G 3/12*    (2006.01)
(52) U.S. Cl.
USPC ............................. 280/124.128; 280/124.116
(58) Field of Classification Search ........... 280/124.116, 280/124.122, 124.128, 124.13, 124.152
See application file for complete search history.

(56) References Cited

U.S. PATENT DOCUMENTS

| 3,430,975 A | * | 3/1969 | Wolf ............................. 280/103 |
| 3,767,224 A | * | 10/1973 | Schneeweiss .......... 280/124.128 |
| 4,655,467 A | * | 4/1987 | Kitzmiller et al. ............ 280/444 |
| 5,340,142 A | * | 8/1994 | Kuhns .......................... 280/444 |
| 5,566,969 A | | 10/1996 | Tattermusch |
| 6,074,016 A | * | 6/2000 | Blondelet et al. ............. 301/127 |
| 6,158,759 A | * | 12/2000 | Perry ........................... 280/444 |
| 6,722,675 B2 | * | 4/2004 | Bidwell ........................ 280/89 |
| 7,758,056 B2 | * | 7/2010 | VanDenberg et al. . 280/124.128 |
| 2010/0052281 A1 | | 3/2010 | Bitz et al. |

FOREIGN PATENT DOCUMENTS

| DE | 2415708 A1 | 10/1975 |
| DE | 4419221 C1 | 7/1995 |
| DE | 19827329 A1 | 9/1999 |
| DE | 102006033755 A1 | 1/2008 |
| FR | 2319507 A1 | 2/1977 |
| FR | 2612460 A1 | 9/1988 |
| JP | 7232524 A | 9/1995 |

OTHER PUBLICATIONS

German Patent Office, German Search Report for German Application No. 102011012373.3 dated Nov. 29, 2011.

* cited by examiner

*Primary Examiner* — Toan To
(74) *Attorney, Agent, or Firm* — Ingrassia Fisher & Lorenz, P.C.

(57) ABSTRACT

A suspension of a vehicle axle is provided having a twist-beam axle that includes, but is not limited to two trailing arms, each of which have a wheel suspension and are interconnected via a cross brace with a torsion profile, which is designed stiff to bending and torsionally soft. The twist-beam axle connects to a Watt linkage of arrowed design, which articulates on the trailing arms laterally offset to an axis through a wheel center of the wheel suspension.

12 Claims, 7 Drawing Sheets

SUSPENSION OF A VEHICLE AXLE AND VEHICLE

CROSS-REFERENCE TO RELATED APPLICATION

This application claims priority to German Patent Application No. 10 2011 012 373.3, filed Feb. 24, 2011, which is incorporated herein by reference in its entirety.

TECHNICAL FIELD

The technical field relates to a suspension of a vehicle axle, for example of a rear wheel axle, and to a vehicle having such a suspension.

BACKGROUND

German Patent DE 44 19 221 C1 describes a suspension of a rear axle of a motor vehicle. The lateral guidance of the rear axle is effected via a Watt linkage, both of whose links on their respective one side in the marginal region are articulated on an axle tube and on their respective other side on the two ends of a swing arm rotatable about an axis. Based on the forward driving direction, the swing arm is arranged behind support points of the two links on the axle tube, so that the Watt linkage is of an arrowed design.

A torsion bar stabilizer is provided to reduce the lateral inclination of the vehicle structure when driving through curves, which is articulated on the vehicle structure via joints and on the axle tube via joints. The axle tube furthermore is cardanically supported on the vehicle structure via an elastic joint, which is arranged in a middle longitudinal plane of the vehicle, i.e., the joint allows a rotary movement of the axle tube about all three space axes. Furthermore, space is available between the axle tube and the Watt linkage for a depression for accommodating a spare wheel provided in the vehicle structure.

According to DE 44 19 221 C1 a highly complicated construction is described where an axle tube is provided that is torsionally rigid in all directions and suspended from a point of the body. Due to this arrangement, an additional U-shaped torsion bar stabilizer is required for reducing the lateral leaning when driving through curves.

Therefore, at least one object is to provide an improved suspension of a vehicle axle. In addition, other objects, desirable features, and characteristics will become apparent from the subsequent summary and detailed description, and the appended claims, taken in conjunction with the accompanying drawings and this background.

SUMMARY

A suspension of a vehicle axle is provided that comprises a twist-beam axle with two trailing arms, each of which having a wheel suspension and are interconnected via a cross brace with a torsion profile that is designed stiff to bending and torsionally soft. The twist-beam axle is connected to a Watt linkage of arrowed design, which is articulated on the trailing arms laterally offset to an axis through a wheel center of the wheel suspension. A vehicle is also provided that comprises such a suspension for at least one vehicle axle.

Through the twist-beam axle, whose torsion profile is embodied stiff to bending and torsionally soft, omission of an additional stabilizer is possible. Through the combination with the arrowed Watt linkage, a lateral force is absorbed that occurs, for example, when driving through a curve.

In an embodiment, the twist-beam axle is fastened to the vehicle body at two points or locations. A complicated cardanic support in one point as in the prior art is not necessary. According to an embodiment, the twist-beam axle connects to a trailing arm on each side, for example, through welding. The trailing arms each have a bushing mount for receiving a bushing or A-bushing. The twist-beam axle connects to the vehicle body or rotatably mounts on the vehicle body via the bushings or A-bushings.

In another embodiment, the Watt linkage is articulated on the trailing arms against the driving direction, i.e., behind the wheel center of a wheel suspension. In this case, a sudden change of the force direction is avoidable, which can otherwise occur when the Watt linkage is provided in the region of the wheel center of the wheel suspension.

In another embodiment, the Watt linkage comprises a first and a second Watt link, which are articulated with an end each to a central link and with the other end each to an associated trailing arm. The central link in this case is preferentially arranged displaced in a horizontal plane of the vehicle in the direction of the vehicle rear or the vehicle front in order to form the arrowed Watt linkage. Through the arrowed Watt linkage, an increased lateral force understeer is achievable in embodiments.

In another embodiment, the central link is displaced by a predefined distance in the horizontal vehicle plane to a vehicle transverse axis in the direction of the vehicle rear or the vehicle front. The vehicle transverse axis in each case runs through the point on that the corresponding Watt link is articulated on the trailing arm. The distance by which the central link is arranged offset on the body preferentially has a value in a range from approximately 20 mm to approximately 50 mm. Additionally or alternatively, the respective Watt link has an angle to the vehicle transverse axis preferably in a range from approximately 1.7° to approximately 4.3°. Since the Watt linkage compared to a known Watt linkage, for example the Watt linkage of DE 44 19 221 C1 mentioned at the outset, is designed significantly less severely arrowed, it can absorb a substantially higher component of a lateral force, for example a component of approximately 80% to approximately 90% of the lateral force.

According to another embodiment, the central link can be connected to the vehicle body rotatable about a fulcrum by means of a holder. In an embodiment, the holder is designed in such a manner that the central link can be fastened to the vehicle body displaced by the same distance in the direction of the vehicle rear and in direction of the vehicle front. Therefore, two holders are not necessary for each direction.

In a further embodiment, the holder here is designed rotatable in such a manner that the central link can be fastened to the body offset by the same distance in direction of the vehicle rear and in direction of the vehicle front. Alternatively, the holder is displaceable relative to the body in another embodiment such that the central link is fastenable to the body with the holder offset with the same distance in the direction of the vehicle rear and in direction of the vehicle front.

The above configurations and further developments can be combined as desired as insofar as practical. Further possible configurations further developments and implementations also comprise not explicitly mentioned combinations of features of the invention described with respect to the exemplary embodiments before or in the following. In particular, the person skilled in the art will also at individual aspects as improvements or additions to the respective basic form.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and there is no intention to limit application and uses. Furthermore, there is no intention to be bound by any theory presented in the preceding background of the invention or the following detailed description.

The enclosed drawings are to impart further understanding of the embodiments. They illustrate embodiments and in connection with the description serve to explain principles and concepts. Other embodiments and many of the mentioned advantages result with respect to the drawings. The elements of the drawings are not necessarily shown drawn to scale relative to one another.

Figure 1:
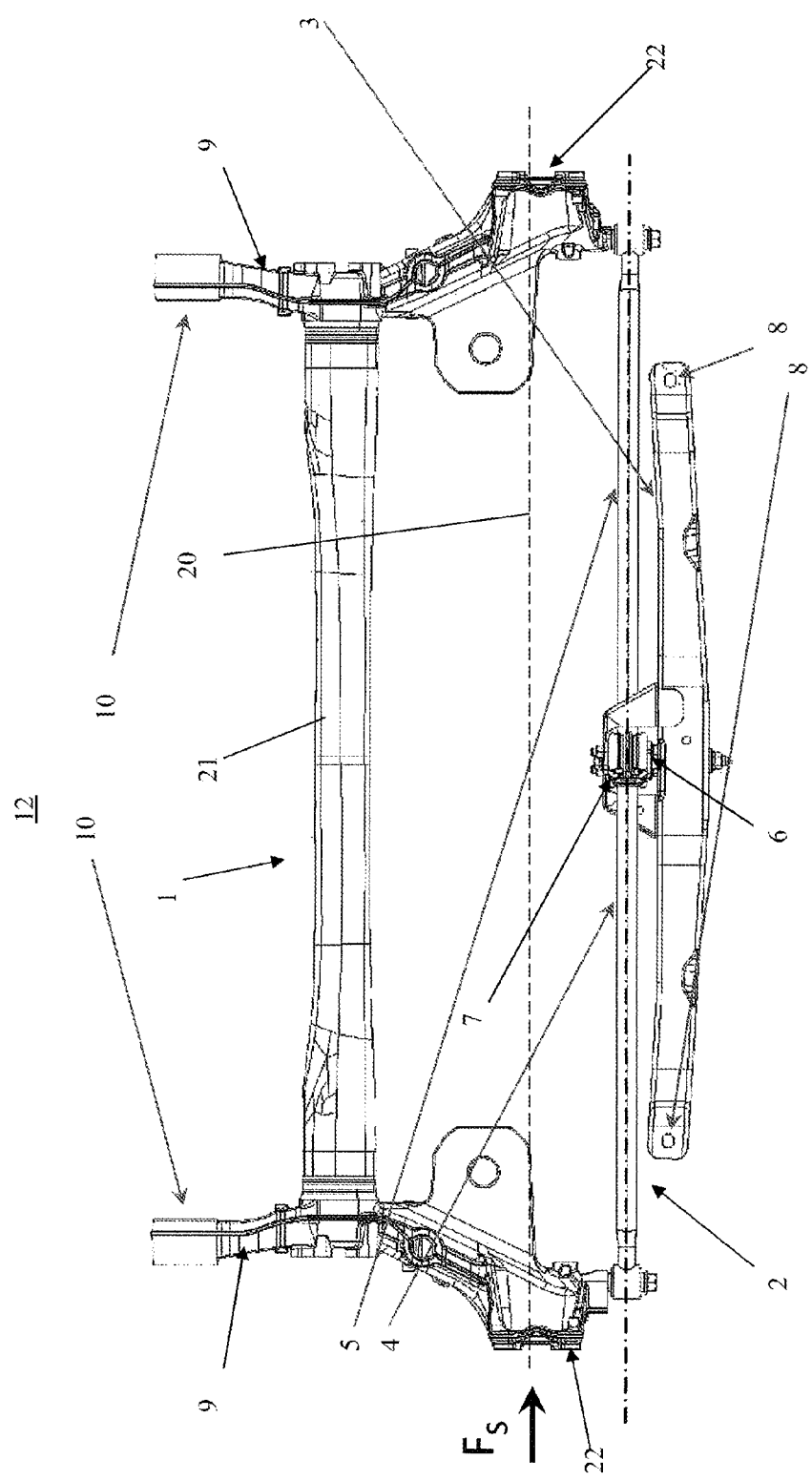
FIG. 1 is a top view of a twist-beam axle with a Watt linkage and a cross member.
Figure 2:
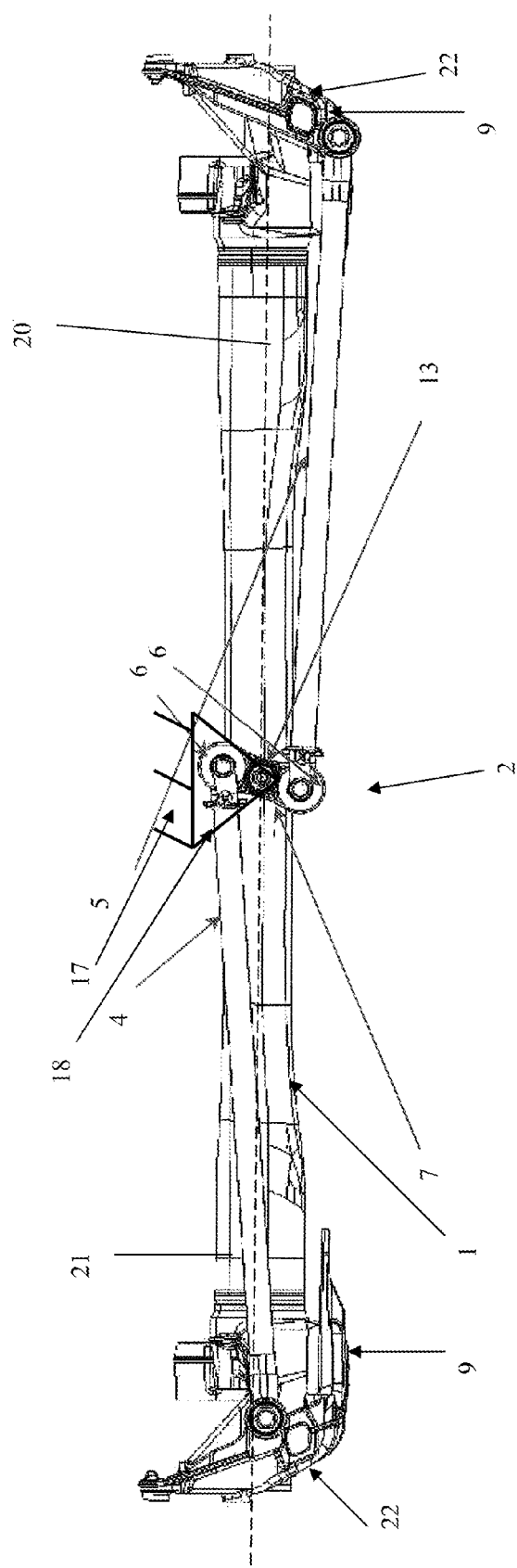
FIG. 2 is a view from the rear of the twist-beam axle and of the Watt linkage according to FIG. 1 without the cross member in a rear view.

FIG. 1 shows a top view of a twist-beam axle 1 with a Watt linkage 2, a cross brace 21 with a torsion profile and a cross member 3. FIG. 2 in turn shows the twist-beam axle 1 and the Watt linkage according to FIG. 1 in a view from the back, where the cross member is not shown here for the sake of clarity. As is shown in FIG. 1 and FIG. 2, the Watt linkage 2 in this case comprises two Watt links 4, 5, which are connected to a central link 7 via joints 6. The central link 7 in turn is rotatably mounted on the cross member 3. The fulcrum 13 of the central link 7 in this case is shown in FIG. 2. Here, the cross member 3 is tied to a vehicle structure or a vehicle body. In the exemplary embodiment shown in FIG. 1, the cross member 3 comprises two fastening points 8 for fastening to the vehicle body.

As is shown in FIG. 1, the twist-beam axle 1 with Watt linkage 2 has the Watt links 4, 5 arranged net-parallel in the top view. The two Watt links 4, 5 in this case are positioned in a common plane. In addition, the cross member 3 of the twist-beam axle 1 is connected to one of the trailing arms 9 each on both sides, more preferably welded to one of the trailing arms 9 each on both sides. The trailing arms 9 in this case each have a wheel suspension 22. An axis 20 or wheel suspension axis 20 runs through a wheel center of the wheel suspension 22 or of a wheel of the vehicle fastened to the wheel suspension 22.

As is indicated in FIG. 1 by the arrow, the twist-beam axle 1 reacts to a lateral force Fs, as occurs for example when driving through curves, normally in an oversteering manner. This behavior however is not desired, since this is beyond the normal driver in an emergency, e.g., in the case of a highway off-ramp traveled at too high a speed. The vehicle can become unstable in this case.

A way of solving this problem is the Watt linkage 2. Here, the greatest part of the lateral force Fs is directed via the Watt links 4, 5 and the central link 7 into the cross member 3 and thus into the vehicle structure of vehicle body. The twist-beam axle 1 now reacts to lateral forces with understeer. Another way of at least reducing the oversteer tendency is the use of part bushings or A-bushings (not shown) in vehicle longitudinal direction for the rotatable mounting of the twist-beam axle 1 on the vehicle body, which have a bushing stiffness of for example between approximately 1,250 N/mm and approximately 2,500 N/mm. However, the twist-beam axle 1 now becomes uncomfortable, since it can no longer yield in vehicle longitudinal direction when travelling over an obstacle. In FIG. 1, a mount 10 for a bushing or A-bushing each is shown on each of the trailing arms 9 for tying the twist-beam axle to the vehicle body at these two locations.

Since with a Watt linkage 2 the oversteer problem is solved in a different manner, these hard A-bushings are no longer necessary and softer A-bushings can be installed. The softer A-bushings in this case have a reduced bushing stiffness in vehicle longitudinal direction of for example between approximately 400 N/mm and approximately 700 N/mm. As a result, the twist-beam axle 1 becomes more comfortable.

FIG. 2 shows the twist-beam axle 1 with its two trailing arms 9 and the cross member 3 as well as with its Watt linkage 2 according to FIG. 1 in a view from the rear. As shown in FIG. 2, the trailing arms 9 each comprise the wheel suspension 22. The axis 20 or wheel suspension axis 20 runs through a wheel center of the wheel suspension 22 or of a wheel of the vehicle fastened to the wheel suspension 22.

The two Watt links 4 and 5 in this case are each articulated on the associated trailing arm 9 with one end. With the other end, the two Watt links 4 and 5 are each articulated on the central link 7 via the joints 6. The central link 7 in this case has a fulcrum 13, about which the central link 7 is rotatable. The central link 7 in this case is connected to the vehicle body 17 at the fulcrum 13. To this end, a holder 18 is provided, which is connected to the vehicle body 17 and on which the central link 7 with a fulcrum 13 is rotatably articulated. The holder 18 of the central link 7 is fixed to the body. The cross member can be embodied very small in vehicle transverse direction and is then designated holder 18 of the central link 7.

Figure 3:
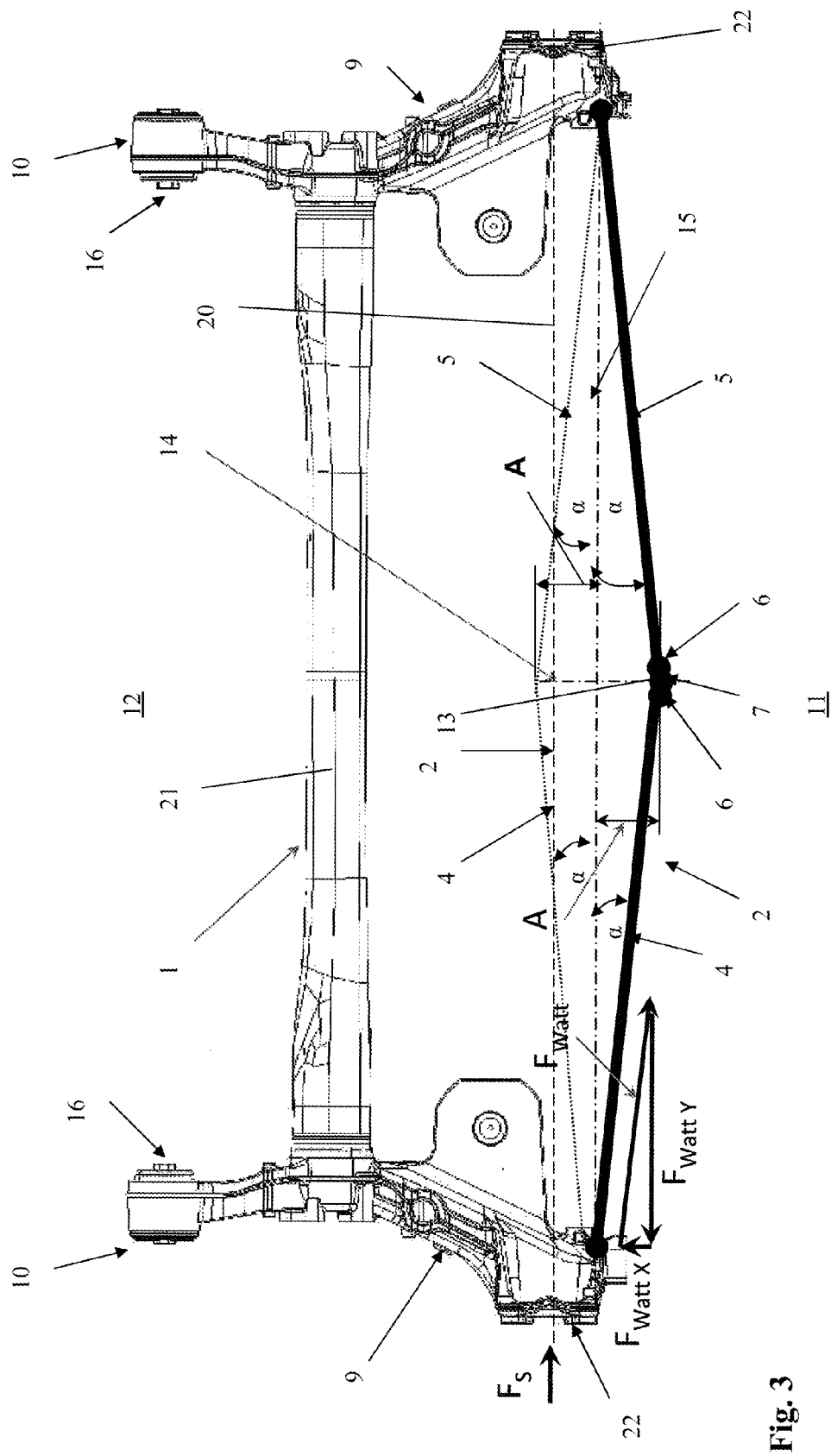
FIG. 3 is a top view of a suspension of a vehicle axle according to an embodiment, where the suspension comprises a twist-beam axle with a Watt linkage.

FIG. 3 now shows a top view of an embodiment of a twist-beam axle 1 with a Watt linkage 2 according to an embodiment. As is shown in FIG. 3, the trailing arms 9 each likewise comprise the wheel suspension 22. The axis 20 or wheel suspension axis 20 runs through a wheel center of the wheel suspension 22 or of a wheel of the vehicle fastened to the wheel suspension 22. Here, the Watt linkage 2 with its two Watt links 4, 5 and a central link 7 is represented schematically and highly simplified. The cross member or holder is not shown in the exemplary embodiment for the sake of clarity.

As is illustrated in the exemplary embodiment in FIG. 3, the Watt linkage 2 comprises the two Watt links 4, 5 that are connected to the central link 7 via joints 6. The central link 7 in this case has a fulcrum 13, through which its rotary axis 14 runs. The central link 7 in this case is likewise connectable to the vehicle body with its fulcrum 13, as previously with reference to the exemplary embodiment in FIG. 2.

Furthermore, the twist-beam axle 1 is not connected to the vehicle body or rotatably mounted at a point but at two points or locations. To be more precise, the twist-beam axle 1 is rotatably connected to the vehicle body via bushings or A-bushings of the trailing arms 9 connected with it. The twist-beam axle comprises the cross member 3 with a torsion profile, the cross member 3 in this case is fastened to the two trailing arms 9 with its torsion profile, for example welded.

The trailing arms 9 in this case, as previously described with reference to the exemplary embodiment in FIG. 1 and FIG. 2, each comprises a mount 10 for the A-bushing 16. By way of the A-bushings, the twist-beam axle can be suitably connected to the vehicle body and pivoted about the axis of the A-bushings. The A-bushings 16 and their holder 10 in this case form the mounting for the twist-beam axle 1 on the vehicle body.

The torsion profile of the cross brace 21 of the twist-beam axle 1 is stiff to bending and torsionally soft in contrast with the DeDion axle, as it is employed in the above mentioned DE 44 19 221 C1. The DeDion axle in the DE 44 19 221 C1 is only connected or cardanically supported at one point with the vehicle body and apart from this stiff in all directions. For this reason, the DeDion axle of the DE 44 19 221 C1 requires an additional U-shaped torsion bar stabilizer for reducing the lateral leaning of the vehicle body when driving through curves. Such an additional torsional bar stabilizer however is not necessary with the embodiment and consequently not provided. This functionality is assumed by the cross brace 21 with its torsion profile.

In the embodiment of the invention shown in FIG. 3, the Watt linkage 2 is for example not arranged at the height or the axis 20 through the wheel center of the wheel suspensions 22 of the trailing arms 9, but in a horizontal and/or vertical vehicle plane laterally slightly offset to the wheel suspension 22 or the wheel suspension axis 20, e.g., arranged in the direction of the vehicle rear 11. In the event that the Watt linkage 2 would be positioned in the region of the wheel suspension axis 20, an undesirable force direction change could occur during driving.

The central link 7 of the Watt linkage 2 is provided in the vehicle offset to the back, so that the Watt linkage 2 is designed arrowed. To be more precise, the central link 7 is arranged in a horizontal and/or vertical vehicle plane, for example, in the direction of the vehicle rear 11 offset to the back. The central link 7 in the exemplary embodiment in FIG. 3 is offset in a horizontal vehicle plane by a predetermined distance A to the back (in the direction of the vehicle rear 11), preferentially by a distance A in a range from approximately 20 mm to approximately 50 mm.

Thus, as is shown in the top view in FIG. 3, the respective Watt link 4 or 5 of the Watt linkage 2 is arranged in a horizontal plane of the vehicle at an angle $\alpha$ to a vehicle transverse axis 15. The vehicle axis runs through the respective point at which the Watt link 4 or 5 is articulated on the associated trailing arm 9. With for example a distance A=approximately 20 mm, the angle $\alpha$=approximately 1.7°, with for example a distance A=approximately 30 mm, the angle $\alpha$=approximately 2.7° and with for example a distance A=approximately 50 mm, the angle $\alpha$=approximately 4.3°. These angles are dependent on the length of the Watt links and must thus be seen as an example. In the exemplary embodiment, as it is shown in FIG. 3, the rotary axis 14 of the central link 7 is also shown in a dash-dotted line. The position of the Watt links 4, 5 and of the central link 7 in this case remains, if viewed in a view from the back, comparable to the view of the Watt linkage 2 from the back in FIG. 2, substantially unchanged or is changed only slightly.

In a second embodiment, the displacement of the central link 7 by the distance A takes place in the direction of the vehicle front 12 instead of in the direction of the vehicle rear 11 as previously. FIG. 3, the arrangement of the two Watt links 4, 5 in this case is indicated by a dotted line schematically and highly simplified in this case. This means that the central link 7 is offset by the predetermined distance A to the front (in direction of the vehicle front 12) in the second embodiment according to the invention, preferentially by the distance A in a range from approximately 20 mm to approximately 50 mm. As is shown in the top view in FIG. 3, the Watt links 4, 5 of the Watt linkage 2 are arranged in a horizontal plane of the vehicle at an angle $\alpha$ to the vehicle transverse axis 15. The vehicle transverse axis 15 in this case is provided transversely or approximately 90° to the vehicle longitudinal axis. Accordingly, with for example a distance A=approximately 20 mm, the angle $\alpha$=approximately 1.7°, with for example a distance A=approximately 30 mm, the angle $\alpha$=approximately 2.7° and with for instance a distance A=approximately 50 mm, the angle $\alpha$=approximately 4.3°. These angles are dependent on the length of the Watt links and must thus be seen as examples.

The first embodiment has the advantage that this configuration leads to more lateral force understeer. The reason for this is that the lateral force Fs leads to a force FWatt in the Watt link 4. This force FWatt can be split into FWatt-Y and FWatt-X. The force FWatt-X causes a rotation of the twist-beam axle 1 about a vehicle vertical axis and thus leads to a desired increased lateral force understeer. One can also utilize this effect in order to influence the roll control of the axis of the Watt link to a certain degree. Here, a displacement of the central link in the direction of the vehicle rear 11 leads to an increase in the roll understeer.

A displacement of the central link 7 to the rear, i.e., in the direction of the vehicle rear 11, leads to more space between the transfer strut with distortion profile and the central link 7. This space can be utilized by larger components such as, for example, an exhaust muffler, a fuel tank, etc. All more space between a hot muffler and the central link can be created. When doing so, a heat protection plate can be saved under certain conditions.

Figure 4:
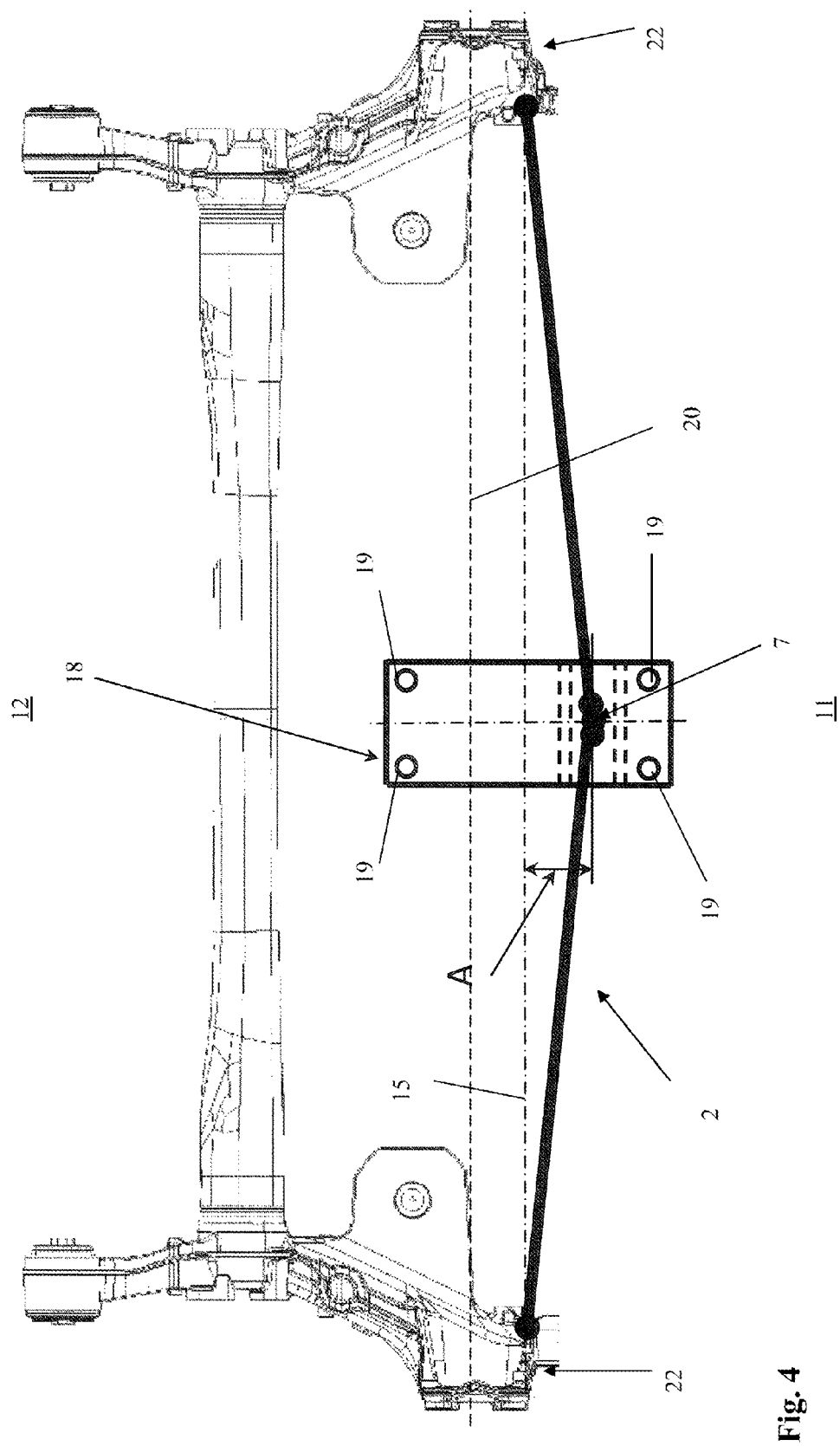
FIG. 4 is a top view of the suspension of the vehicle axle according to FIG. 3, where an exemplary embodiment of a holder for a central link of the Watt linkage is shown.
Figure 5:
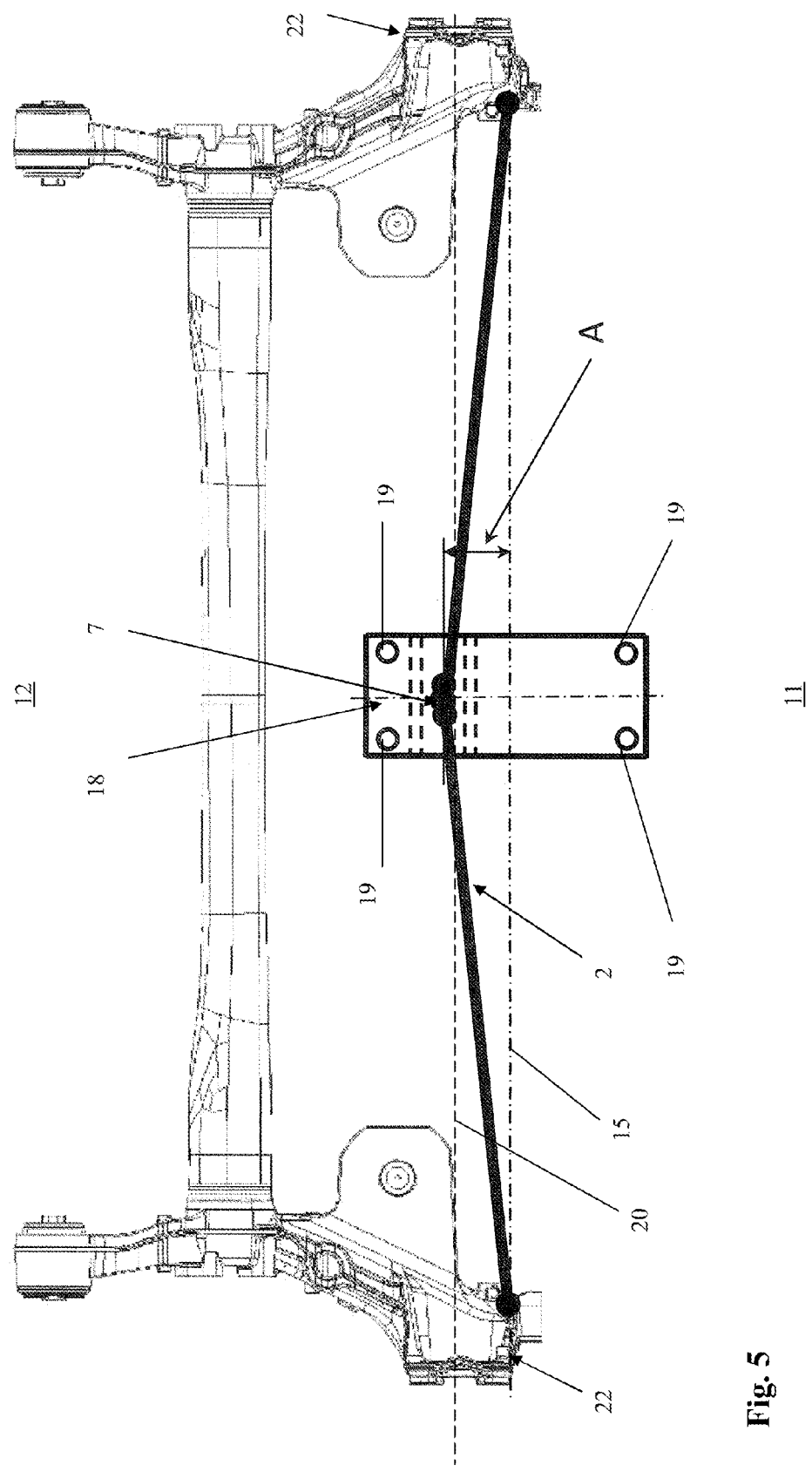
FIG. 5 is a further top view of the suspension of the vehicle axle according to FIG. 4, where the holder positions the central link in driving direction on the body.

The second embodiment has the advantage that more lateral force oversteer can be generated. This behavior can be utilized for a sportive chassis tuning on a vehicle. In FIG. 4 and FIG. 5, a top view of the embodiment of a twist-beam axle 1 is shown with its trailing arms 9, the cross brace 21 and a Watt linkage 2 according to FIG. 3. In FIG. 4, the central link 7 of the Watt linkage 2 is arranged displaced in the direction of the vehicle rear 11 and in FIG. 5 in the direction of the vehicle front 12. As is shown in FIGS. 4 and 5, a holder 18 can be provided for the central link 7 of the Watt linkage 2, which is designed for example "symmetrically" and can thus be employed for both embodiments (same part usage).

The holder 18 shown in the exemplary embodiment in FIG. 4, for example, comprises four fastening points 19, which correspond to four corresponding fastening points of the body, so that the central link 7 can be tied to the body offset in the direction of the vehicle rear 11 by the distance A, as in the first embodiment. If the central link 7 is to be provided offset instead by the distance A in the direction of the vehicle front 12, as in the second embodiment, the holder 18 merely has to be fastened to the body suitably rotated, as shown in FIG. 5. For example, the four fastening points of the body can be utilized again.

Figure 6:
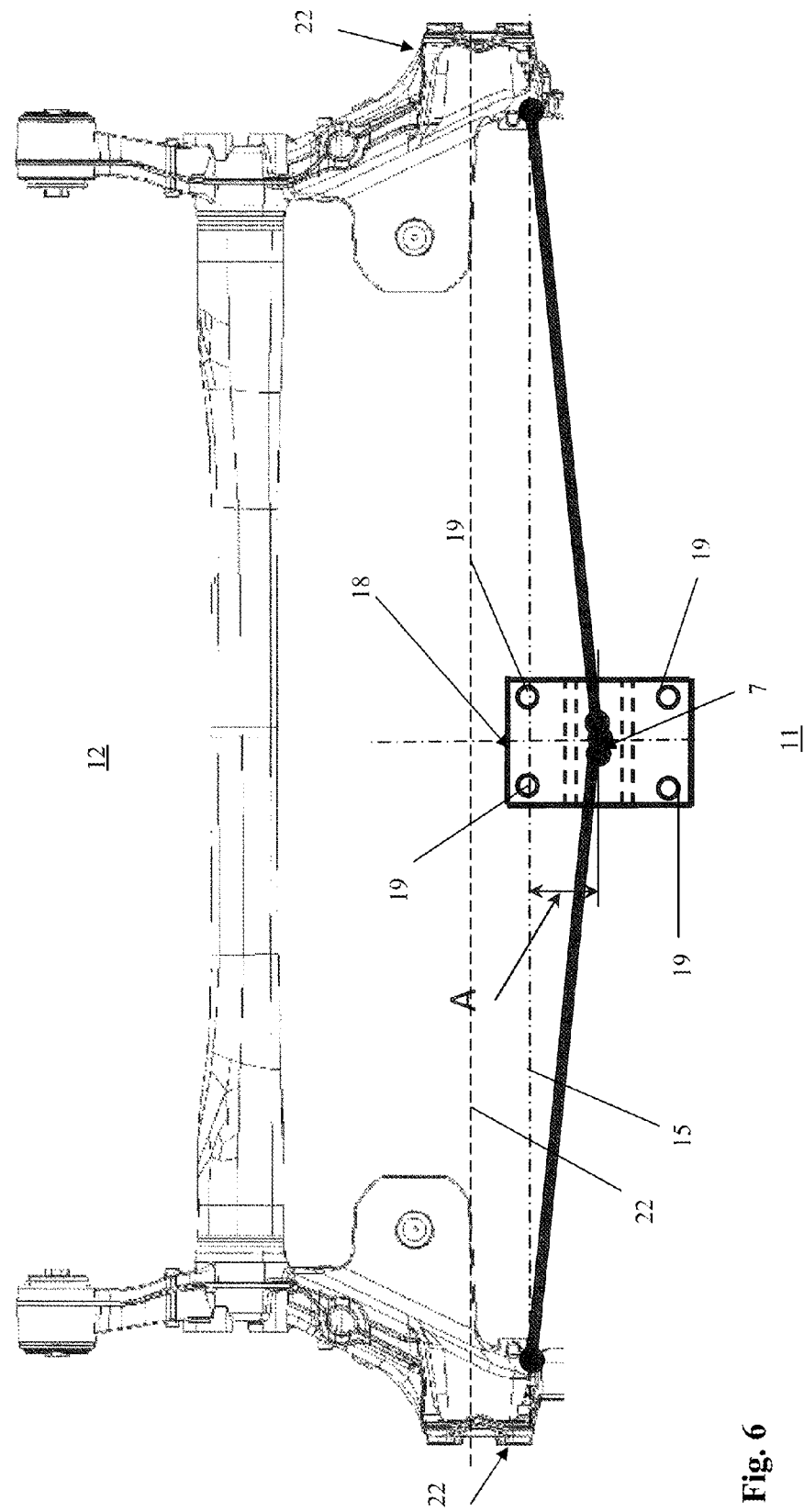
FIG. 6 is a top view of the suspension of the vehicle axle according to FIG. 3, where a further exemplary embodiment of a holder for a central link of the Watt linkage.
Figure 7:
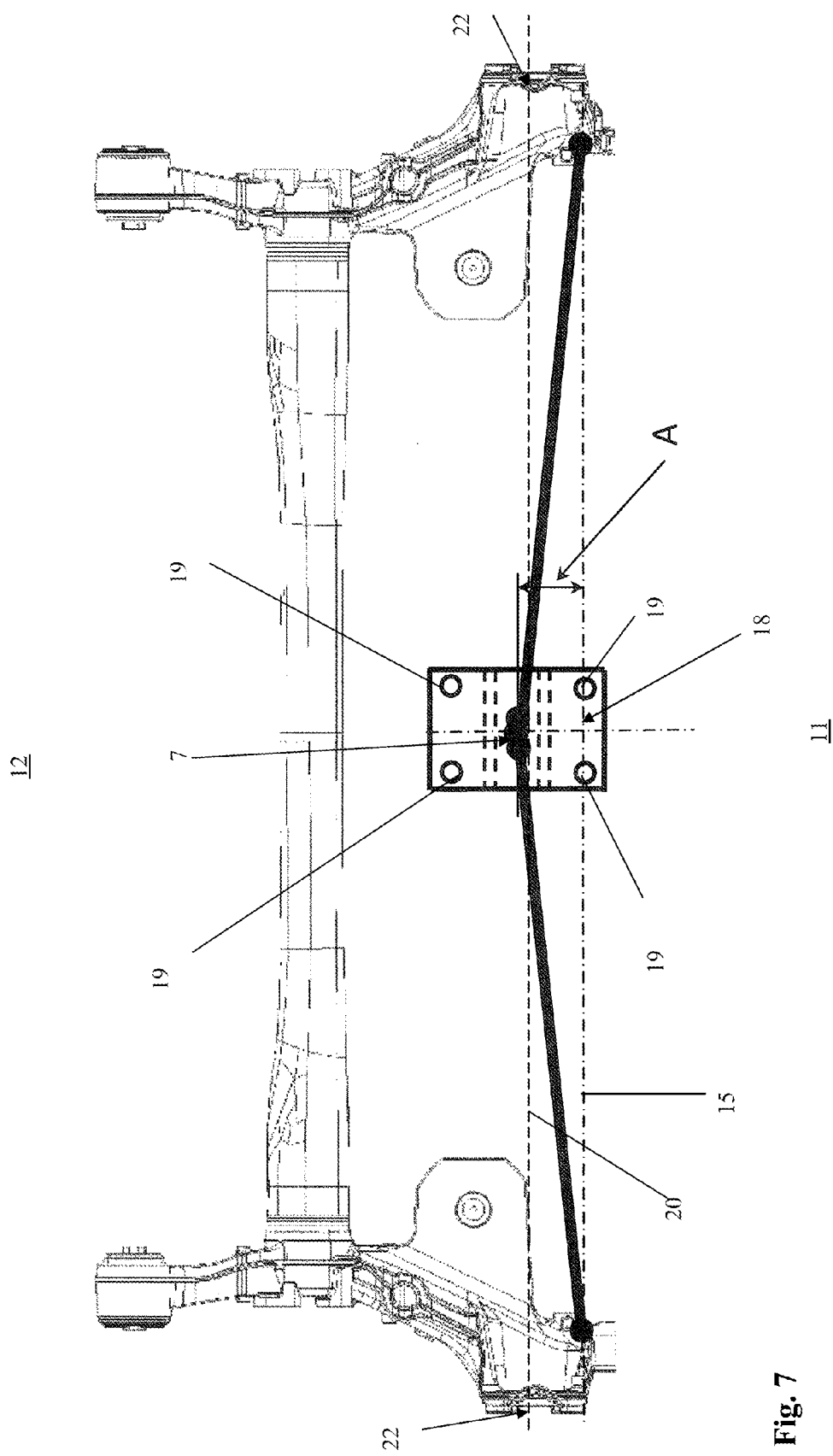
FIG. 7 is a further top view of the suspension of the vehicle axle according to FIG. 6, where the holder positions the central link in driving direction on the body.

In FIG. 5, the central link 7 of the Watt linkage 2 according to the second embodiment is arranged by the distance A in the direction of the vehicle front 12. FIG. 6 and FIG. 7 likewise shows a top view of the embodiment of a twist-beam axle 1, with its trailing arms 9, the cross brace 21 and a Watt linkage 2 according to FIG. 3. In FIG. 6, the central link 7 of the Watt linkage 2 is arranged displaced in the direction of the vehicle rear 11 and in FIG. 7 in the direction of the vehicle front 12.

Here, as in the exemplary embodiment according to FIGS. 6 and 7, a holder 18 with, for example, four fastening points 19 is provided for tying the central link 7 to the vehicle body.

Here, the vehicle body comprises six fastening points. The holder 18 is designed so that it merely has to be suitably displaced with its four fastening points 19 in order to tie the central link 7 once in the direction of the vehicle rear 11, as shown in FIG. 6, or once in the direction of the vehicle front 12, as shown in FIG. 7. Here, the four fastening points 19 of the holder 18 in each case coincide with four of the six fastening points of the body.

In principle, a holder 18, which for example comprises only two fastening points (not shown), can also be used. In this case, it is sufficient if the body has four fastening points, of which two fastening points each are utilized for fastening the holder 18 if the holder 18 positions the central link 7 in direction of the vehicle rear 11 or the vehicle front 12 by the distance A.

FIG. 4 to FIG. 7 additionally shows exemplary embodiments for the arrowed arrangements of the Watt linkage. The central link 7 of the Watt linkage in this case can be arranged for example within or without the axes 15 and 20 or can additionally coincide or substantially coincide with the axis 15 or the wheel suspension axis 20.

Although the embodiments were described completely, there is no restrictions, but can be modified in a wide variety of ways. In addition, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A suspension of an axle of a vehicle, comprising
a twist-beam axle;
two trailing arms of the twist-beam axle, each of the two trailing arms comprises a wheel suspension;
a cross brace interconnecting the two trailing arms with a torsion profile, which is designed stiff to bending and torsionally soft; and
a Watt linkage connected to the twist-beam axle, the Watt linkage having an arrowed design that is laterally offset to an axis through a wheel center of the wheel suspension articulated on the two trailing arms.

2. The suspension according to claim 1, wherein the twist-beam axle is fastened to a body of the vehicle at two points.

3. The suspension according to claim 1, wherein the twist-beam axle is connected to on each side of at least one of the two trailing arms, which comprises an A-bushing mount configured to receive an A-bushing, and the twist-beam axle is configured for connection to a body of the vehicle via the A-bushing.

4. The suspension according to claim 1,
wherein the Watt linkage is articulated on the two trailing arms in a horizontal vehicle plane that is laterally offset to the axis through the wheel center of the wheel suspension, and
wherein the Watt linkage is arranged in the horizontal vehicle plane that is offset in a direction of a rear of the vehicle rear.

5. The suspension according to claim 1,
wherein the Watt linkage is articulated on the two trailing arms in a horizontal vehicle plane that is laterally offset to the axis through the wheel center of the wheel suspension, and
wherein the Watt linkage is arranged in the horizontal vehicle plane that offset in the horizontal vehicle plane in a direction of the vehicle front to the axis through the wheel center of the wheel suspension.

6. The suspension according to claim 1, wherein the Watt linkage comprises a first Watt Link and a second Watt link that are articulated with an end to a central link and with another end on an associated trailing arm of the two trailing arms, and the central link is arranged in a horizontal vehicle plane displaced in a direction of the vehicle rear or the vehicle front.

7. The suspension according to claim 6, wherein the central link is arranged displaced by a predetermined distance in the horizontal vehicle plane to a vehicle transverse axis in the direction of the vehicle rear or the vehicle front, and the vehicle transverse axis in each case runs through a point on which an associated Watt link is articulated on the associated trailing arm of the two trailing arms.

8. The suspension according to claim 7, wherein the predetermined distance has a value in a range from approximately 20 mm to approximately 50 mm and the respective Watt link forms an angle $\alpha$ in a second range from approximately 1.7° to approximately 4.3° with the vehicle transverse axis in the horizontal vehicle plane.

9. The suspension according to claim 6, wherein the central link is connected to a body of the vehicle with a holder in a manner that is rotatable about a fulcrum.

10. The suspension according to claim 9, wherein the holder is configured such that the central link is fastenable to the body of the vehicle that is offset by a substantially similar distance in the direction of the vehicle rear and in the direction of the vehicle front.

11. The suspension according to claim 9, wherein the holder is configured to rotate such that the central link is fastenable to the body of the vehicle with the holder that is offset by a substantially similar distance in the direction of a rear of the vehicle and in a second direction of the vehicle front.

12. The suspension according to claim 9, wherein the holder is configured for displacement relative to the body of the vehicle such that the central link is fastenable to the body with the holder that is offset with a substantially similar distance in the direction of the vehicle rear and in the direction of the vehicle front.

* * * * *